Jan. 2, 1940.   C. W. HECOX   2,185,552
WEED PULLER
Filed Jan. 9, 1939
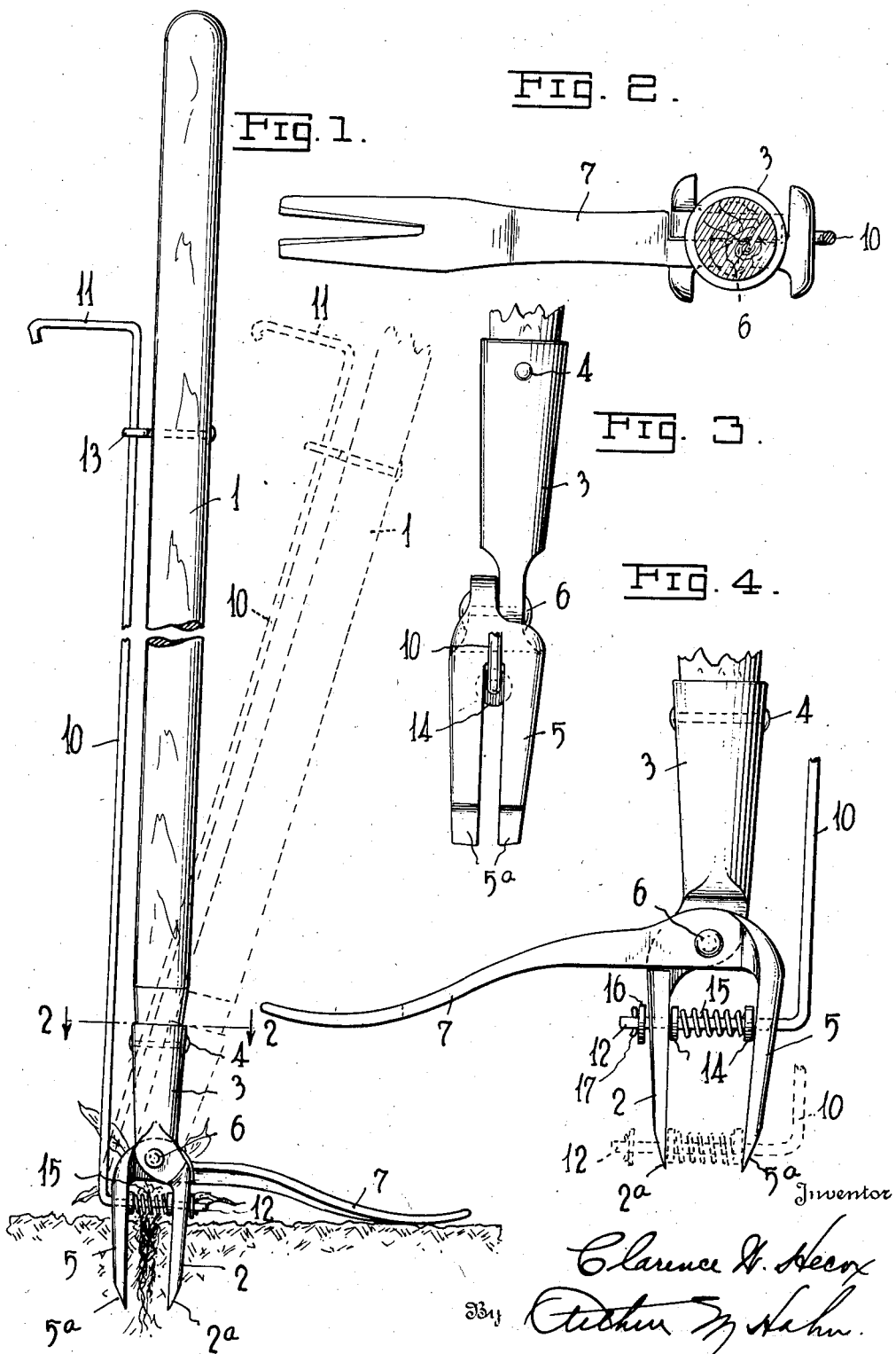
Inventor
Clarence W. Hecox
By Stephen M. Hahn
Attorney Patented Jan. 2, 1940

2,185,552

UNITED STATES PATENT OFFICE 2,185,552

WEED PULLER

Clarence W. Hecox, Arlington, Va.

Application January 9, 1939, Serial No. 250,045

3 Claims. (Cl. 55—148)

This invention relates to weed pullers and is directed more particularly to the ejector mechanism for such devices.

The type of weed puller to which my invention is particularly directed, consists of a vertically disposed handle, on the lower end of which is a pair of jaws. One of the jaw members is directly attached to the handle, while the other cooperating jaw member is pivotally attached thereto and is provided with a lateral extension. This lateral extension serves both as a foot rest for forcing the jaws into the ground about the weed roots, and also as a lever for extracting the weed. Devices of this general character are well known in the art and some of these devices are provided with springs and levers to maintain the jaws in normal operating position, and also with ejector rods for freeing the jaws of the weeds and earth that have been extracted.

It is the primary object of my invention to provide a weed puller of this general character which shall require only a single operating rod for maintaining the jaws in normal operating position and which shall also serve as an ejector for freeing the jaws of the extracted weed and earth, thus providing an exceedingly simple and easily operated device.

Another object is to provide a device of the aforesaid character which shall be constructed and arranged in such manner that the ejector mechanism shall be automatically returned to its normal position without the aid of the operator or springs, but by simply forcing the jaws into the earth about the weed.

A further object is to provide a weed puller having an ejector mechanism of the aforementioned character which shall consist of few parts, that are exceedingly simple and inexpensive to manufacture, and which are readily assembled.

With the foregoing and other objects and advantages in view, the invention may be stated to consist in the various novel features of construction and arrangement or combination, all of which will be fully described hereinafter and pointed out in the appended claims.

In the drawing accompanying and forming a part of this application,

Figure 1 is a side elevation of a weed puller fitted with an ejector mechanism constructed in accordance with my invention;

Figure 2 is a transverse sectional view taken on the line 2—2 of Figure 1;

Figure 3 is an enlarged fragmentary side elevation of the lower end of the device; and Figure 4 is a similar view at right angles thereto.

A weed puller of the general type to which my invention may be applied comprises a handle 1, to the lower end of which is fitted a pair of jaw members for engaging and pulling the weed. One of these jaws, indicated at 2 is usually stationary and attached to the handle 1 by means of a socket 3 and a rivet 4. The lower end portion of this jaw member is offset from the vertical axis of the handle and terminates in a bifurcated jaw portion having sharpened ends 2ª to facilitate forcing it into the ground. The other jaw member, indicated at 5 is pivotally connected to the stationary jaw at 6 and is formed with a lateral extension 7 which serves both as a foot rest for forcing the jaws into the ground, and also as a lever for extracting the weed as indicated by the dotted line position in Figure 1. The movable jaw 5 is also bifurcated as shown in Figure 3 and preferably sharpened at its lower end as indicated at 5ª. The aforementioned construction is old in the art and hence no further description thereof is deemed necessary.

My improved extractor mechanism for a weed puller of this general character comprises a rod 10 arranged longitudinally of the handle 1 and provided at its upper end portion with a laterally extending handle 11, and at its lower end with a laterally deflected portion 12 which passes through the tines of the bifurcated jaws 2 and 5. The upper end portion of the rod 10 is guided and supported in any suitable manner, as by a screw eye 13 attached to the handle 1. As shown particularly in Figures 1 and 4, the laterally deflected portion 12 of the rod is fitted with two collars 14 between which is interposed a spring 15 that surrounds the rod and normally urges the collars and jaws 2 and 5 apart, it being understood that the collars 14 are slidably mounted on the rod. A washer 16 and a cotter pin 17 are fitted to the end portion of the rod outside of jaw 2 to prevent the rod from becoming disengaged from the jaws.

In use, the jaws 2 and 5 will be normally maintained in open position as shown in Figure 4. The operator grasps the handle 1 and forces the jaws into the ground about the weed as shown in Figure 1, by pushing downwardly on the jaw extension 7. The handle 1 is then rocked laterally as indicated by the dotted lines in Figure 1, to close the jaws about the weed and free the root thereof from the ground, whereupon the weed may be lifted intact from the ground. It will be noted that ejector rod 12 is freely slidable vertically of the jaws and handle, hence, if the ejector was in the position shown in dotted lines in Figure 4, it is unnecessary to first lift it to the full line position, as the lateral portion will engage the ground and ride upwardly as the jaws are forced into the ground. After the weed and small amount of associated earth are extracted, the operator pushes downwardly on handle 11 while holding the end of the device over a suitable container, whereupon the weed is ejected and the jaws are opened and the device is in position for extracting the next weed. In this connection, I preferably select the spring 15 so that when the jaws are in open position, the spring will be under practically little or no tension, hence, when the jaws are closed about the weed and associated earth, the friction and cohesion of the weed and earth will maintain the jaws in closed position, but a slight downward push on handle 11 will immediately open the jaws and the laterally directed portion 12 of the ejector rod will positively force the weed and earth from the jaws. It is thus apparent that the device is easily operated by anyone and with minimum effort, as the only time the operator need touch ejector rod handle 11 is when the weed is actually being ejected.

What I claim is:

1. The combination with a weed puller having a pair of bifurcated jaws, one movable with respect to the other, of an ejector rod arranged along the handle of the device and having a laterally extending portion passing through the tines of said bifurcated jaws, and a spring carried by said laterally extending portion and arranged between said jaws.

2. The combination with a weed puller having a pair of bifurcated jaws, one movable with respect to the other, of an ejector rod arranged along the handle of the device and having a laterally extending portion passing through the tines of said bifurcated jaws, and a spring interposed between said jaws and encircling said laterally extending portion of the ejector rod, said spring normally urging said jaws to open position.

3. The combination with a weed puller having a pair of bifurcated jaws, one movable with respect to the other, of an ejector rod arranged along the handle of the device and having a laterally extending portion passing through the tines of said bifurcated jaws, a pair of laterally spaced collars slidable on said lateral portion between said jaws, and a coil spring encircling the lateral portion of said ejector rod and engaging said collars to normally maintain said jaws in open position.

CLARENCE W. HECOX.